United States Patent [19]

Kubo et al.

[11] Patent Number: 4,708,538

[45] Date of Patent: Nov. 24, 1987

[54] TAPPING HEAD

[75] Inventors: Haruaki Kubo; Yoshiyuki Kamanaka, both of Osaka, Japan

[73] Assignee: Daishowa Seiki Co., Ltd., Osaka, Japan

[21] Appl. No.: 748,679

[22] Filed: Jun. 25, 1985

[30] Foreign Application Priority Data

Jun. 29, 1984 [JP] Japan ............................ 59-99420[U]

[51] Int. Cl.⁴ ........................ B23B 47/24; B23B 51/06
[52] U.S. Cl. .................................... 408/59; 10/89 F; 279/20; 408/139
[58] Field of Search ...................... 408/56, 57, 58, 59, 408/60, 139, 140, 141; 279/20; 10/898, 141 M

[56] References Cited

U.S. PATENT DOCUMENTS

| | | | | |
|---|---|---|---|---|
| 2,777,702 | 1/1957 | Rodal | .................................... | 279/20 |
| 3,003,493 | 10/1961 | Miller | .................................... | 408/59 |
| 3,024,030 | 3/1962 | Koch | .................................... | 279/20 |
| 4,080,090 | 3/1978 | Kern | .................................... | 408/59 |
| 4,082,472 | 4/1978 | Mossner et al. | .................. | 408/59 X |
| 4,127,279 | 11/1978 | Wright | .............................. | 279/20 X |
| 4,164,879 | 8/1979 | Martin | .............................. | 408/56 X |
| 4,392,761 | 7/1983 | Eckle | .................... | 408/59 |
| 4,396,317 | 8/1983 | Staron et al. | ........................ | 408/59 |
| 4,531,865 | 7/1985 | Johnson | .............................. | 408/139 |

Primary Examiner—Gil Weidenfeld
Assistant Examiner—Glenn L. Webb
Attorney, Agent, or Firm—Koda and Androlia

[57] ABSTRACT

A tapper for loading a spindle of machine tools with a tap. The tapper proper has a shaft to be driven, which is supported under floating axially by means of a pair of springs the pressurizing direction of which are opposite to each other, built-in. Cutting oil is pressurized to be fed from the outside of the tapper proper through oil passages, respectively which are provided on the tapper proper and the shaft to be driven to a oil hole and, in that case, the oil passages are formed such that the resultant hydraulic pressure does not give rise to an action of breaking the floating state of the shaft to be driven.

4 Claims, 6 Drawing Figures

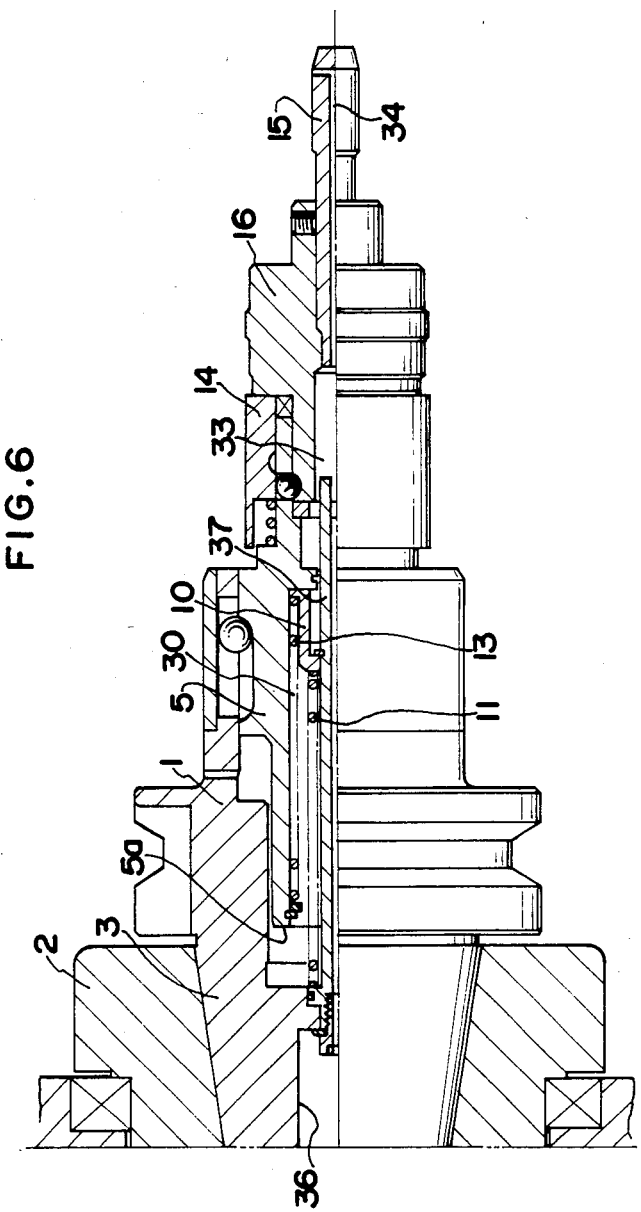

TAPPING HEAD

BACKGROUND OF THE INVENTION

1. Field of the Invention

The present invention relates to the tapper with oil feeder which is mainly set to a tool driving spindle of NC machining center with automatic tool changer (ATC) so that it may be used.

A difinition of the NC machining center with ATC is an arrangement that cutting tools such as the tapper are housed in optional lines within a magazine being provided near to the machining center in advance, the magazine is rotated such that necessary cutting tool comes to its taking-out position in response to a unit selecting signal, the cutting tool is taken out by means of a manipulator, and a full automatic control based on instructions input by a computer covers an action of loading the tool driving spindle with the cutting tool or housing the cutting tool, etc. which completes its actuation, locating on the spindle, into the magazine.

In the case of performing the cutting process by such a automatic machine, in order to reduce a outbreak of frictional heat at the process, the cutting oil has to continue to be poured on the tool edge of the tap during maching as well as there is a necessity of giving rise to no impedance to the full automatic control.

2. Conventional technology

This kind of tapper with oil feeder may be classified, depending on its oil feeding system, into so-called side through type in which oil feeding is executed from the side face axially perpendicular to the tapper proper to the inside and a side through type in which the oil feeding is executing axially, i.e. from the shaft center to the inside. The former system is illustrated in FIG. 5, whereas the latter is illustrated in FIG. 6.

Referring first to FIG. 5, a description of the structure of the conventional tapper with oil feeder is made; 1 is a tapper proper, on the base end side of which a shank part 3 to be fitted into the tool driving spindle 2 is located. A mounting hole 4 of comparatively larger diameter is axially made in the tapper proper, the shaft to be driven 5 is mounted in said mounting hole 4 in such a way that said shaft to be driven 5 can be freely removed in an axial direction, and, similarly to such an embodiment of the present invention as shown in FIG. 2, guide grooves 6 and 7 (not shown in FIG. 5) which are made on the internal periphery of the tapper proper 1 and the external periphery of the shaft to be driven 5 corresponding to said internal periphery thereof, respectively, a guide ball 8 being fitted into the part between these guide grooves 6 and 7, the resultant guide mechanism of which causes the shaft to be driven 5 to be rotated as one unit with the tapper proper 1 without being obstructed its rotational motion by the foregoing axial removal. The shaft to be driven 5, formed to be of cylindrical shape the entire inside part of which is integrally extended from the shaft center of the tapper proper 1 toward the top end thereof settled near the hollow section 30 of the base end side of said shaft 5, rings for receiving springs 10 are supported for being slidably fitted at the external peripheral side of the top end part of the tension shaft 9, compression springs 11 which pressurize the shaft to be driven 5 up to the top end side thereof are provided between the rings for receiving springs 10 and the tapper proper 1 (the base end face of the mounting hole 4), tension springs 13 which pressurize the shaft to be driven 5 up to the base end side with a pressurizing force slightly weaker than that of the foregoing pressurizing action up to the top, are provided between the rings for receiving springs 10 and pieces for receiving springs 12 being located on the shaft to be driven 5, and engerized resilient force, taking place in each of directions opposite to each other, by both the springs 11 and 13 against the shaft to be driven (floating shaft) 5 causes said shaft to be driven 5 to be supported under the floating state in the tapper proper 1. By means of a connecting and removing device 14, provided on the top end side of the shaft to be driven 15, a tap holder 16 for holding the tap 15 is detachably mounted to the shaft to be driven 5.

A statement of the oil feeder may show that an annular supporting casing 17 is rotatably supported on the external peripheral side of the tapper proper 1 by bearings 18, a cylinder for receiving oil 19, being axially extended, is integrally formed on the external peripheral side of said supporting casing 17, and a hollow pin 20, cylindrical, is slidably fitted into said cylinder 19, while being resiliently pressed toward the base end side by springs 21. A detent member 22, which is radially projected toward the tapper proper 1, is provided on the external peripheral side of the hollow pin 20, in a manner corresponding to said detent member 22, a recessed section to be notched 23 with which the detent member 22 is engaged is formed on the tapper proper 1, and a check vavle comprising springs 24 and a ball valve which undergoes a resilient force from said springs 24 is provided in the inside of the hollow pin 20. The oil feeding passage 27 capable of communicating with the hollow pin 20 is formed on a oil feeding block 26 which is fixed to a fixing member 25 which supports the spindle 2. A communicating passage is radially formed in the cylinder for receiving oil 19, a passage through which the oil flows 29, which communicates with said communicating passage 28, is formed in the tapper proper 1, connecting passages 31, which makes a connection between the hollow section 30 and the above mentioned passage through which the oil flows 29 is formed in the shaft to be driven 5, and said hollow section 30 communicates by way of the passage 32 being provided on the top end part of the tension shaft 9 with the tap holder 16 mounted on the top end part of the shaft to be driven 5 and the oil passages 33 and 34 provided on the tap 15 being held by said tap holder 16.

In order to use such a oil feeder, by means of fitting the detent member 22, which is illustrated by a chain line in FIG. 5, into the recessed section to be notched 23 which is located on the side of the tapper proper 1, the supporting casing 17 is adapted to be held on the orientation of the tapper proper 1, under such a oil feeder's state of which the tapper is housed in the predetermined magazine. At the work, by means of engaging the shank part 3 with the spindle 2, while grasping the section to be grasped 35 with the manipulator, at the same time when the hollow pin 20 communicates with a oil feeding passage 27 of a oil feeding block 26, a resultant pressurizing of said hollow pin 20 by said oil feeding passage 27 will cause said hollow pin 20 to makes a retreat against the resilient force from the spring 21, upon an occurence of which the detent member 22 in turn will come off out of the recessed section to be notched 23, whereby a relative rotation of the shaft to be driven 5 with regard to the supporting casing 17 is ready to be commenced.

Of course, a rotation of the tapper proper 1 is accompanied with that of the shaft to be driven 5, the tap located on its top end side causing a tapped hole to be made, an impact taking place when the tap 15 gets in touch with the workpiece to be machined is reduced by damping springs 11 and, at the same time, during the intermediate course of making the tapped hole, the shaft to be driven 5 makes an advance independently of the tapper proper 1, while being guided also by the tapped hole by itself, upon completion of making the tapped hole, a reversive rotation of the shaft to be driven 5 leading to a commencement of the retreat of said shaft to be driven 5 under the assistance from a guidance by the tapped hole by itself as well as a tensile force by the tension springs 13. For this reason, in addition to a reduction of the removal stroke distance of the tapper proper 1 by itself, the shaft to be driven 5 can move forward and/or backward, while being axially balanced its motion in an axial direction by means of both the springs 11 and 13.

The cutting oil which is fed from the oil feeding block 26 through the hollow pin 20 and the cylinder for receiving oil 19, is received from the communicating passage 28 into the passage through which the oil flows, from which said cutting oil passes the connecting passages 31, being fed into the hollow section 30 of the shaft to be driven 5, and it is supplied through the passage 32 to the oil passage 34 of the tap 15 so that it is finally adapted to be poured on the tapped hole where cutting is under way.

According to the conventional tapper with oil feeder, the structure and actuating conditions of which are referred to as above, there may be the following shortcomings:

Namely, during the intermediate course of cutting process, as shown by an arrow A of FIG. 5, the cutting oil passes from the passage through which the oil flows 29 through the hollow section 30 of the shaft to be driven 5, and is supplied from the passage 32 to the side of the tap 15, whereas, as shown by an arrow B, it, passing the hollow section 30, is fed into the side of the base end part of the shaft to be driven 5, whereby it comes to pressurize the end face 5a thereof. In that case, although any serious problem does not occur, if the pressure of the cutting oil is relatively lower, in the cases where such an pressure is increased, the oil passage 34 of the tap 15 is clogged, or a resistance in the tube is larger, because the oil passage 34 is small in diameter, the hydraulic pressure being applied to the end face 5a of the shaft to be driven 5 results in being increased, due to which the shaft to be driven 5, being pushed by such a pressure, gets out of the foregoing fine balanced state, making a rapid advance proportionally to a rise in pressure so that the situation occurs in which the tap 15 is damaged or there is an inability in fabricating accurately the hole to be tapped.

Such a spindle through type tapper as shown in FIG. 6 also possesses the forgoing shortcomings.

If a description putting a focuse only on different points from the side through type tapper of FIG. 5 is made, the spindle through type tapper employs the construction in which a passage for receiving oil 36, which communicates with the oil feeding passage (not shown) being provided on the shaft center of the spindle 2, is axially provided in the shank part 3 of the tapper proper 1, and, at the same time, a oil flowing pipe 37, which, passage the hollow section 30 of the shaft to be driven 5, is extended to the top end side, is extendedly provided in the tapper proper 1, communicating with the passage for receiving oil 36. The ring for receiving spring 10 is fitted in the external peripheral side of the above-mentioned oil flowing pipe 37, supporting both the springs 11 and 12. For this reason, some portions of the cutting oil, which, passing from the oil feeding passage 36 to the oil flowing pipe 37, is supplied to the side of the tap 15, is fed from the hollow section of the shaft to be driven 5 to the base end side so that they pressurize the end face 5a of the shaft to be driven 5, being forced to be fed to the top end side due to the pressure differential-area corresponding to the internal diameter of the oil flowing pipe 37, thereby producing the foregoing trobules.

BRIEF SUMMARY OF THE INVENTION

The purpose of the present invention is to form the oil feeding passage which does not feed the cutting oil to the end face of the shaft to be driven, in the tapper with oil feeder including the side through type and the spindle through type.

As the features of the present invention, the passage for receiving oil, which is located on the side of the tapper proper, and the hollow section through which oil flows, located on the side of the shaft to be driven, are connected to each other such that any back pressure is not applied to the shaft to be driven.

For this reason, according to the present invention, since the cutting oil which is fed from the passage for receiving oil to the hollow section for flowing oil of the shaft to be driven has its pressure acted only in the hollow section to which the back pressure is not applied, even if the oil passage of the tap is clogged, or it is apt to be clogged, the pressure area which intends to force the shaft to be driven toward the base end side is identical to the pressure area which intends to force the same toward to the top end side in the hollow section, thereby producing the characteristics that the floating condition of the shaft to be driven is not broken in the tapper proper by the pressure form the cutting oil.

For this reason, according further to the present invention, while since the pressure from the cutting oil does not cause the shaft to be driven to be rapidly removed to the top end side, the any damage is not given to the tap during tapping work, since the feeding of the shaft to be driven is always balanced to the predetermined value, the characteristics of the present invention lie in the capability of forming accurately the hole to be tapped.

According still further to the present invention, since the pressure from the cutting oil can be increased to a considerable extent, the characteristics of the present invention lie in that an exhaust of the cutting oil or compressed air from the tap can automate to eliminate cutting chips which are left around the prepared hole before the commencement of the tapping work.

Other characteristics and purposes of the present invention shall be apparent from the following description made in conjunction with the attached drawings:

BRIEF DESCRIPTION OF THE DRAWING

FIGS. 5 and 6 are longitudinal side views, repectively of prior art.

DETAILED DESCRIPTION

Figure 1:
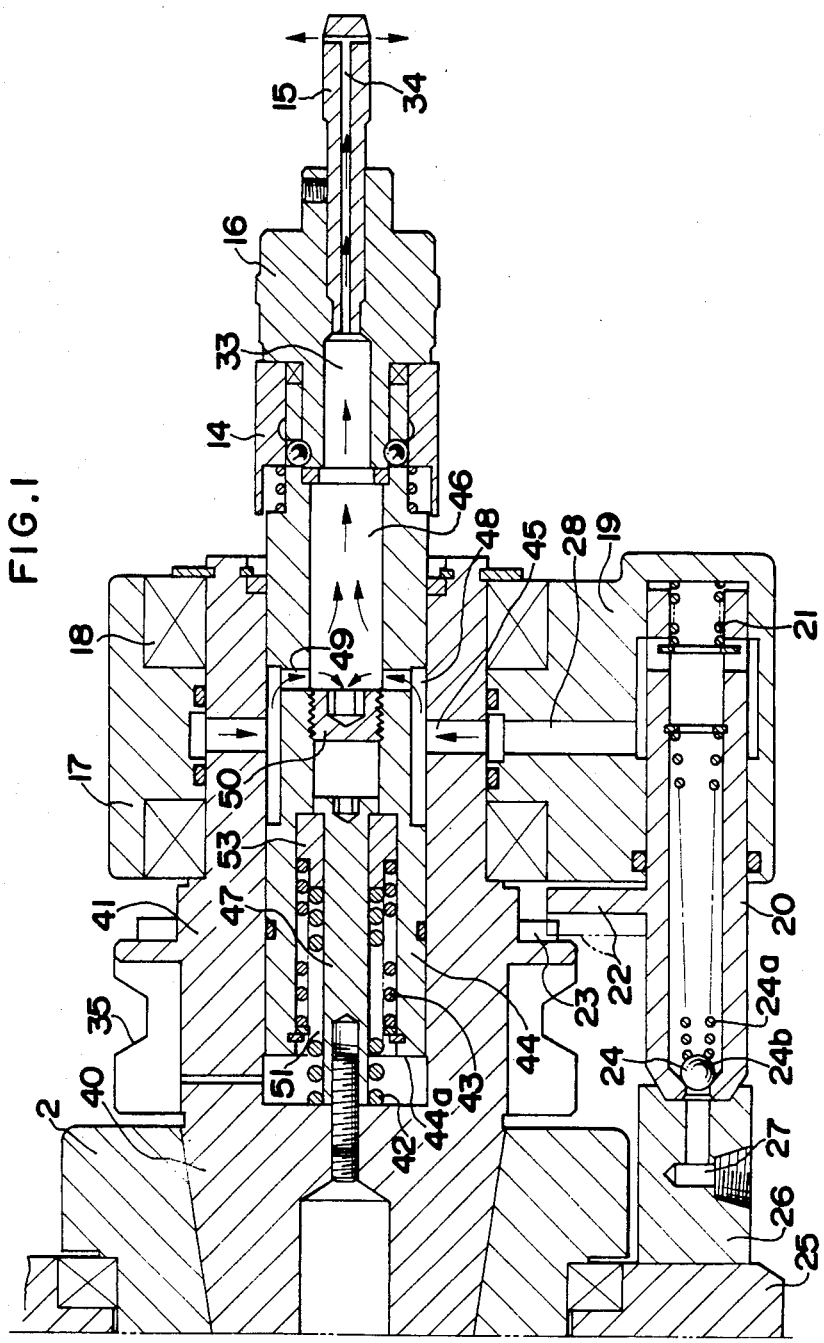
FIG. 1 is a longitudinal side view of 1st embodiment according to the present invention.
Figure 2:
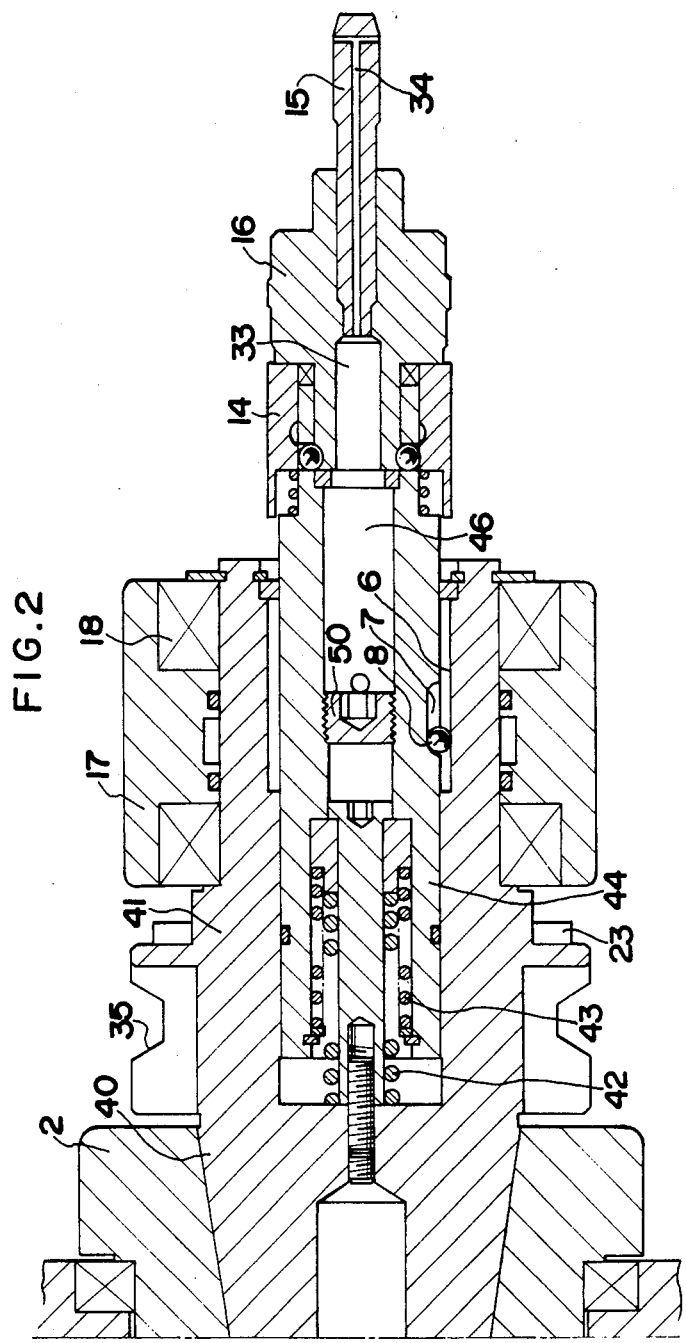
FIG. 2 is a cross-sectional plan view of the same.

FIGS. 1 and 2 illustrates 1st embodiment of the present invention and shows the side through type tapper with oil feeder. A description, putting a focus only on different points between the foregoing conventional technology and 1st embodiment, in which the latter's constituent elements identical to the former's ones are given by the same characters and explanatory subsection of these elements is omitted, may show the tension shaft 47 which is extended from the shaft center of the tapper proper 41 to the direction of the top end, is located nearer to the base end side of the shaft to be driven 44 in comparison with the conventional technology. The outline of the conventional technology may be applied to the structure in which the damping springs 42 and the stretching springs 43 are pressurized for being supported by the rings for receiving springs 53 being fitted into said tension shaft 47. The passage through which oil flows 45, provided on the tapper proper 41 and the hollowsection for flowing oil 46 are connected to each other by the connecting passage 48 which is slightly extended in an axial direction and the connecting hole 49 and a plug 50 is screwed in the hollow section of the shaft to be driven being correspondingly located on the place where above-mentioned connecting passage 48 is provided, thereby intercepting completely the hollow section nearer to the base end side 51 of the shaft to be driven 44 from the above-mentioned hollow section for flowing oil 46. Such a structure is regarded as the most marked characteristic of the present invention and it permits the pressurized oil which is fed from the passage through which oil flows 45 to the hollow section for flowing oil 46 of the shaft to be driven 44 to be supplied only to the side of the tap without an inroad of the pressurized oil into the end face 44a of the shaft to be driven 44. For this reason, in the hollow section 46 the pressure area which intends to force the shaft to be driven 44 to the base end side is identical to that which intends the same to the top end side, whereby the pressure from the cutting oil does not break the state where the shaft to be driven 44 is supported under being balanced finely to float in the tapper proper 41.

Figure 3:
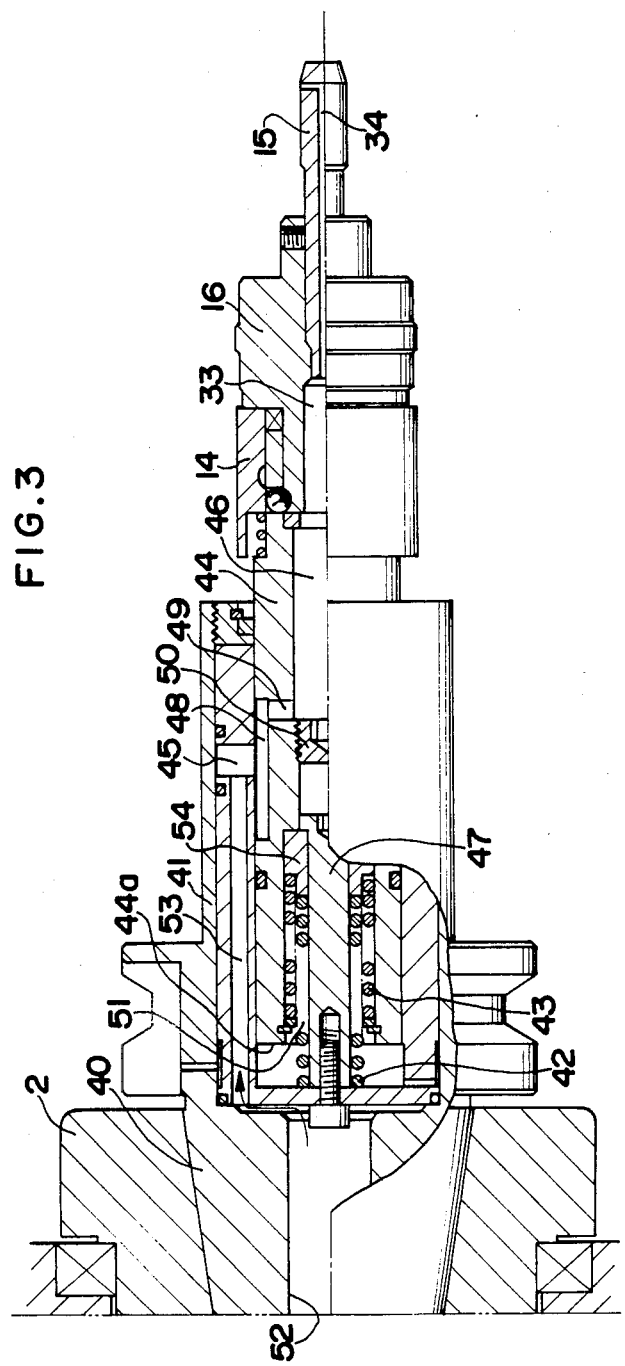
FIG. 3 is a longitudinal side view of 2nd embodiment according to the present invention.

FIG. 3 illustrates 2nd embodiment according to the present invention and shows the spindle through type tapper with oil feeder. A description, putting a focus only on different points between the foregoing conventional technology and 2nd embodiment, in which the latter's constituent elements to the former's ones are given by the same characters and explanatory subsection of these elements is omitted, may show that the outline of the conventional technology is applied to the structure in which the tension shaft 47 is extended from the tapper proper 41 to the side of the base end part in the shaft to be driven 44 and the damping springs 42 and the stretching springs 43 are proessurized for being supported by the rings for receiving springs 54 being fitted in the tension shaft 47. The oil receiving passage 52 which is provided in the shank section 40 of the tapper proper 41 and the passage through which oil flows 45, provided on the top end side of the tapper proper 41 communicate with each other through a by-pass oil passage 53 which is provided on the tapper proper 41, and the cutting oil is fed in an arrow direction. The hollow section for flowing oil 46, which is provided on the shaft to be driven 44 and the foregoing passage through which oil flows 45 are connected to each other by the connecting passage 48 and the connecting hole 49 and the plug 50 is screwed in the hollow section of the shaft to be driven 44 which is correspondingly located on the part where the connecting passage 48 and the connecting hole 49 are provided, thereby intercepting the hollow section located on the base end side of the shaft to be driven 44 from the above-mentioned hollow section for flowing oil 46. This structure is regarded as the most marked characteristic of the present invention and, similarly to the foregoing embodiment, such a structure causes the pressurized oil which is fed from the passage through which oil flows 45 to the hollow section for flowing oil 46 of the shaft to be driven 44 to be supplied only to the side of the tap without an inroad of the pressurized oil into the side of end face 44a of the shaft to be driven 44, to which the balanced pressure is applied for maintaining its floating conditions.

Figure 4:
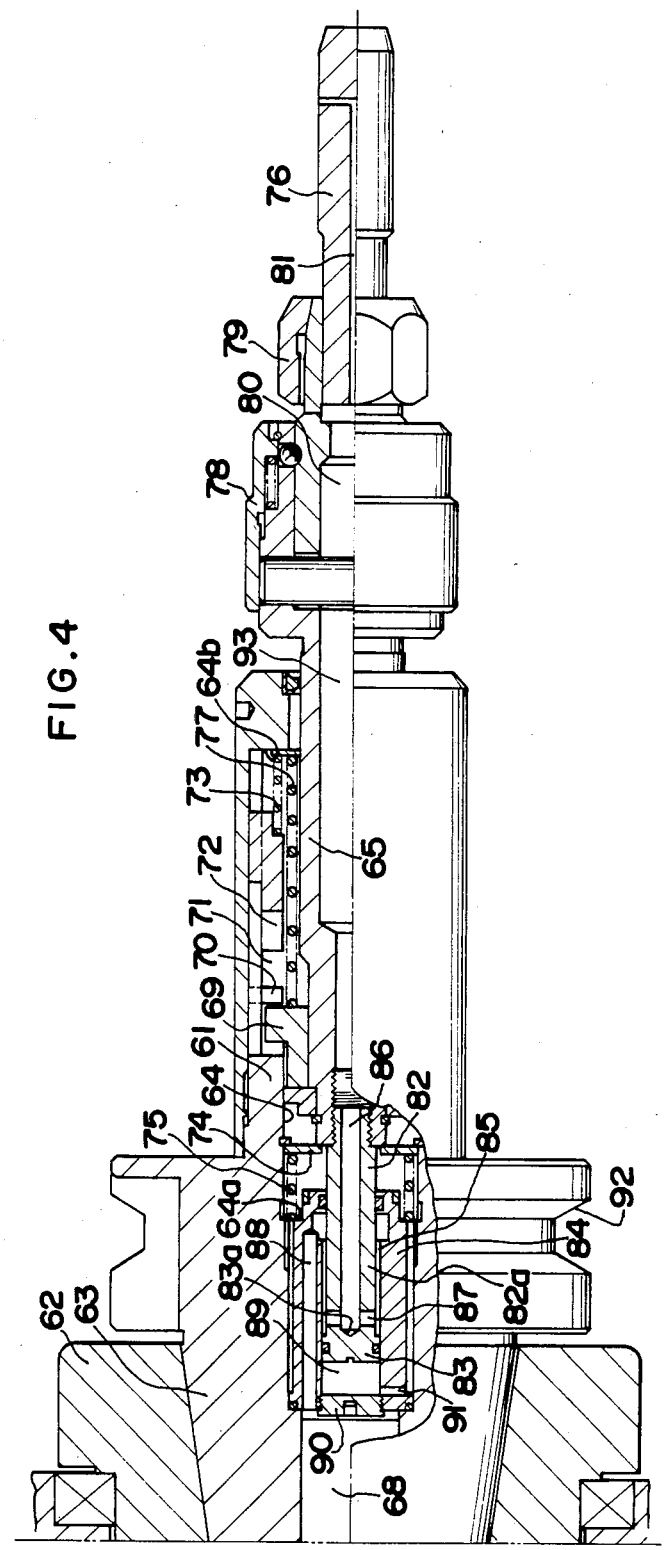
FIG. 4 is a longitudinal side view of 3rd embodiment according to the present invention.
Figure 5:
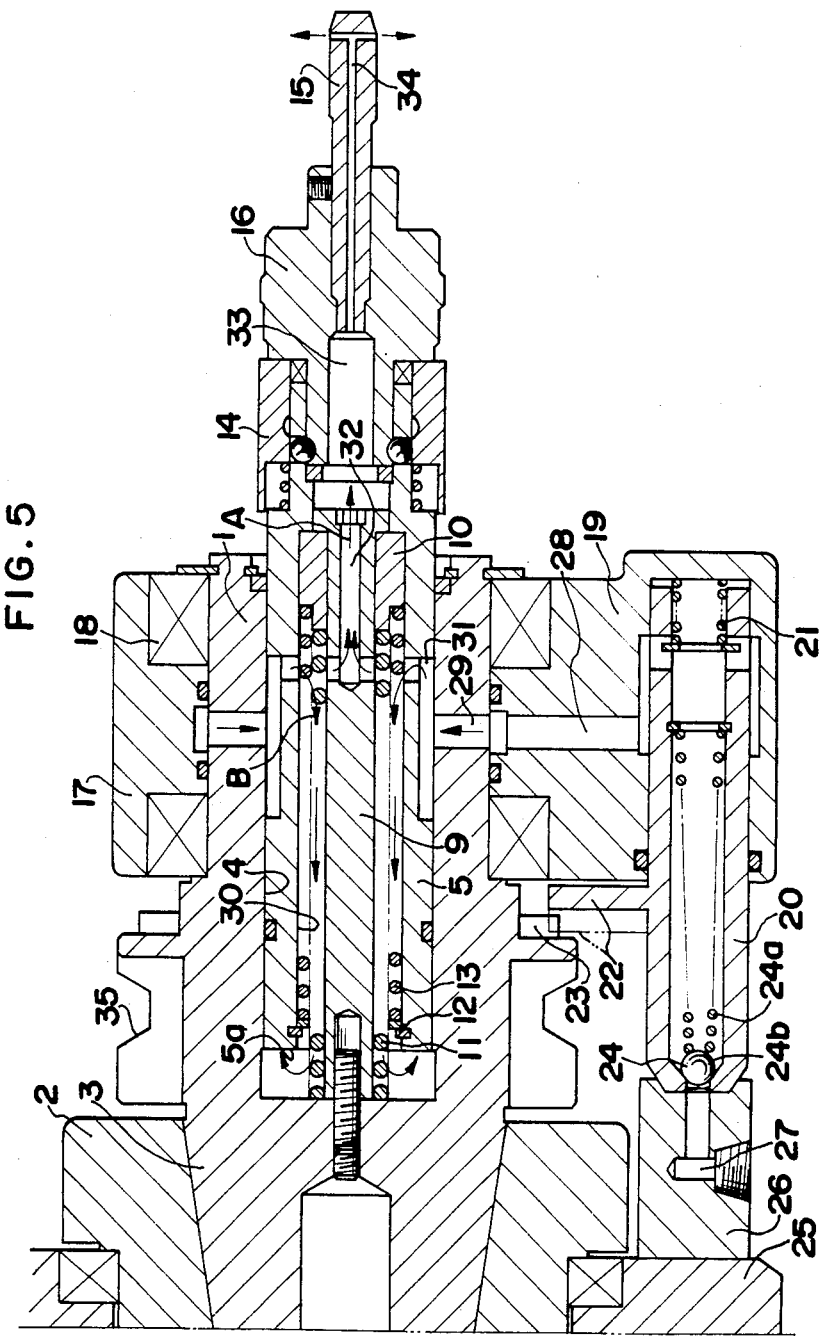

FIG. 4 illustrating 3rd embodiment according to the present invention, is concerned with the tapper in which at the reversive rotation of the spindle, the shaft to be driven is automated to make an axial retreat independently of the tapper proper, being returned to nuetral position. Namely, 61 is a tapper proper, at the side of base end part of which the shank part 63 being fitted into the spindle for driving the tool 62 is located. The oil feeding passage 68 is provided to penetrate axially the central part of the shank part 63 of the tapper proper 61, its base end part side is connected to the oil feeding passage (not shown) which is provided on the shaft center of the spindle 62.

The piece to be suspensively fitted 69 is radially provided on the base end part of the external peripheral side of the shaft to be driven 65 in an extended manner, correspondingly to said piece to be suspensively fitted 69, while a clutch piece for forward rotation 70, by which the above-mentioned piece to be suspensively fitted 69 is fitly held at the forward rotation of the shaft to be driven 65, is provided on the side of the internal periphery of the tapper proper 61 in an extended manner, the hollow section for neutral 71, in which the above-mentioned piece to be suspensively fitted 69 is not held, is provided axially adjacently to said clutch piece 70, and, furthermore, the clutch for reversive rotation 72, by which the above-mentioned piece to be suspensively fitted 69 is held at the reversive rotation of the shaft to be driven 65, is provided axially adjacently to the side of the top end part in an extended manner from said hollow section 71. In that time the clutch for reversive rotation 72, which is rotated integrally with the tapper proper 61, is adapted to be able to be slightly removed in an axial direction, while being supported by the small damping springs 73.

On the side of the base end part of the shaft to be driven 65, the compression spring 75 which, facing the bottom wall 64a, located on the side of the base end part of the mounting hole 64, and the end face of the above-mentioned shaft to be driven 65, is positioned between them and the ring for receiving spring 74 capable of being removed to the side of the base end part, is provided, permitting the impact taking place, when the tap on the side of the top end part of the shaft to be driven 65 gets in contact with the workpiece to be machined, to be reduced. The tension spring 77 which pressurizes the shaft to be driven 65 to the side of the base end part is provided between the above-mentioned piece to be suspensively fitted 69 which is provided in an extended manner on the side of the external periphery of the shaft to be driven 65 and the bottom wall 64b located on the side of the top end part of the mounting hole 64. For this reason, the shaft to be driven 65 is supported under the state of floating axially by means of the above-mentioned compression spring 75 and tension spring 77. The side of the top end part of the shaft to be driven 65 is equipped with the mounting and detaching device 78, by which the top holder 79 for holding the tap 76 is detectably mounted to the shaft to be driven 65. The hollow section 93 of the shaft to be driven 65 communicates with the oil passages 80 and 81 which are provided on the tap holder 79 and the tap 76 held by said tap holder 79.

The oil flowing pipe 82 being extended to the shank side, connected to the hollow section 93 of the shaft to be driven 65, is fixed to the base end part of the shaft to be driven 65 and the piston 83 is fixed to the base end part of said oil flowing pipe 82, which is closed by the side face 83a of said piston 83. The piston 83 is slidably and oiltight fitted in the cylinder 84 fixed to the central part of the tapper proper 61, the oil flowing passage 85 is formed between said cylinder 84 and the oil flowing pipe 82, and the inside of the oil flowing pipe 86 and the oil flowing passage 85 are communicated by way of the oil hole 87 penetrating the side wall 82a of the oil flowing pipe 82 with each other. In parallel with the above-mentioned oil flowing passage 85, the external side of the cylinder 84 is equipped with the bypass oil passage 88, the base end part side of which communicates with the oil feeding passage 68, while its top end part side communicates with the above-mentioned oil flowing passage 85. The hollow section 89 of the cylinder 84, located on the piston side, is covered with a lid 90, thereby preventing an inroad of the cutting oil into the inside, and, at the same time, a air bleeder is provided on the hollow section 89. Such a series of constituent parts may be acceptably mounted to the shank part 63 after being incorporated as unit in an illustrative manner or their integral formation made in the shank part 63 may be also accepted.

When using the tapper of 3rd embodiment, while the part to be grasped 92, which is provided on the side of the external periphery of the tapper proper 61 in an extruded manner, is grasped by the manipulator, engaging of the shank part 63 with the spindle 62 permits the oil feeding passage of the spindle 62 to be connected to the passage for receiving oil 68 of the shank part 63.

A rotation of the tapper proper 61 causes the piece to be suspensively fitted 69 to be held by the clutch for forward rotation 70 so that the shaft to be driven 65 is rotated forward and the tap 76 on the side of the top end part thereof fabricates the hole to be tapped; an impact taking place, when the tap 76 gets in contact with the workpiece to be machined, is reduced by the damping spring 75, during the intermediate course of forming the hole to be tapped, being guided by the tapped hole by itself, the shaft to be driven 65 makes an advance independently of the tapper proper 61, and, upon completion of forming the tapped hole, the piece to be suspensively fitted 69 of the shaft to be driven 65 comes off out of the clutch for forward rotation 70, reaching the hollow section for neutral 71, whereby a transmission of the rotational force from the tapper proper 61 is intercepted so that the shaft to be driven 65 enters into the state of being nuetral. Next, a reversive rotation of the tapper proper 61 by means of the spindle 62 and a slight removal of the tapper proper 61 to the base end part side permit the piece to be suspensively fitted 69 to be engaged from the hollow section for nuetral 71 with the clutch piece 72 for reversive rotation, whereby the shaft to be driven 65 is rotated in a reversive direction. At that time, the small damping spring 73 is adapted to reduce the impact taking place, when the piece to be suspensively fitted 69 is held in the clutch piece for reversive rotation 72. The shaft to be driven 65 is rotated in a reversive direction, the hole to be tapped executes a guidance of the tap by itself, while it is stretched by the stretching spring 77, whereby the tap is drawn to come out of the tapped hole.

For this reason, in addition to a reduction of the removing stroke distance of the tapper proper 61, the shaft to be driven 65, while receiving finely balanced pressure in an axial direction by way of both the springs 75 and 77, specifically the tension spring 77 so that it is maintained to be in the floating state, is adapted to move forward and/or backward.

The cutting oil which is received by the oil feeding passage 68 of the shank part 63 passes by way of the bypass oil passage 88 from the oil flowing passage 85 to the oil hole 87, from which it is pressurized for being fed to the inside (86) of the oil flowing pipe 82, and it passes therefrom the hollow section 93 of the shaft to be driven 65, the oil passage 80, and the oil passage 81 of the tap 76, being poured on the tapped hole whose machining is under way.

According to the present embodiment, since the oil flowing pipe 82 is fixed to the shaft to be driven 65, as it were, constituting some parts of the shaft to be driven 65, the end wall 83a of the piston corresponding to the internal diameter of the oil flowing pipe 82 comes to form partially the end wall located on the base end part side of the hollow section 93 in the shaft to be driven 65. Therefore, the pressure area of the end wall located on the top end part side in the hollow section 93 becomes identical to that of the end wall located on the base end part side thereof, so even if the oil passage of the tap is clogged or it is apt to be clogged, the pressure from the cutting oil does not cause the floating state of the shaft to be driven 65 in the tapper proper 61 to be broken.

What is claimed is:

1. A tapper comprising a tapper proper possessing a shank part on a base end part side thereof, a shaft to be driven which, although said shaft to be driven is rotated integrally with said tapper proper, is built in such that it can be axially freely removed independently of said tapper proper, as well as being supported for being under a floating state by a compression spring and a tension spring which energize resilient forces in directions opposite to each other, characterized in that said tapper proper is provided with a passage for receiving oil flowing from the outside, the shaft to be driven is provided with a hollow section for passing the oil therethrough, which feeds the oil into a tap, an oil hole through which the passage for receiving the oil communicates with the hollow section for passing the oil therethrough, is made on the shaft to be driven, and an end wall of the hollow section for passing the oil therethrough is provided on the shaft to be driven and the end wall comprises a plug which is screwed into the hollow section of the shaft to be driven, a corresponding part of which is located on a position nearer to the base end part of said oil hole.

2. A tapper as defined in claim 1, wherein the tapper proper is rotatably supported by a supporting casing which surrounds an external periphery of said tapper proper, while said supporting casing is held at a predetermined position by a fixing member to which a spindle is mounted, and, in order to communicate with an oil feeding passage in the supporting casing, the passage for receiving the oil of the tapper proper is provided in a direction perpendicular to the center of rotation of the shaft.

3. A tapper as defined in claim 1, wherein the center of the shaft of the shank part of the tapper proper is provided with an oil feeding passage and the passage for receiving the oil of the tapper proper is provided parallel with the center of rotation of the shaft in order to communicate with said oil feeding passage.

4. A tapper as defined in claim 1, wherein a rotational force is transmitted from the tapper proper to the shaft to be driven so that the shaft to be driven may be rotated in forward and or reversive direction, while, at the selection between the forward rotation and the reversive rotation, said rotational force is intercepted from the shaft to be driven, which is maintained to be under a nuetral state.

* * * * *